No. 184,073.
T. W. GRINTER.
PAPER BAG MACHINES.
Patented Nov. 7, 1876.
4 Sheets—Sheet 1.
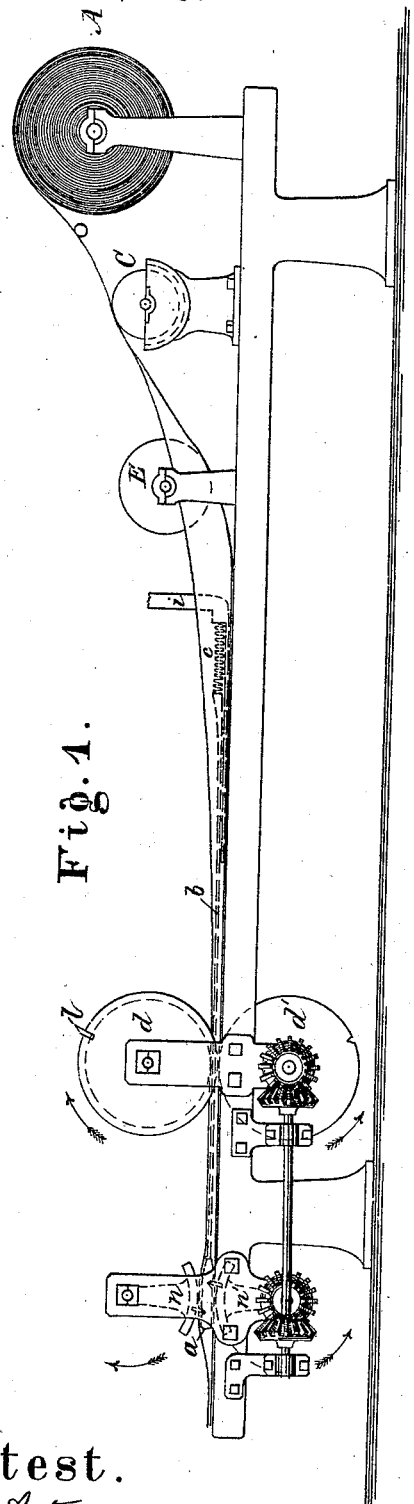
Fig. 1.
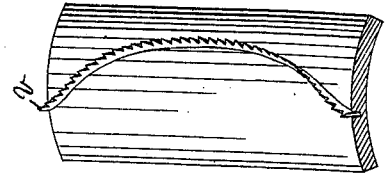
Fig. 5.
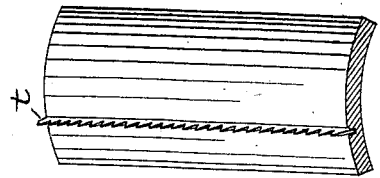
Fig. 4.
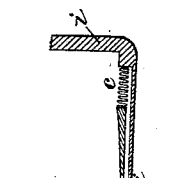
Fig. 2.
Fig. 3.
Fig. 9.
Attest.
J. C. Anton
Geo. E. Jewett
Inventor,
T. W. Grinter 4 Sheets—Sheet 2.

T. W. GRINTER.
PAPER BAG MACHINES.

No. 184,073. Patented Nov. 7, 1876.

Attest.
J. C. Anton
Geo. E. Jewett

Inventor.
T. W. Grinter

T. W. GRINTER.
PAPER BAG MACHINES.

No. 184,073. Patented Nov. 7, 1876.

Attest.
J. C. Anton
Geo. Jewett

Inventor.
T. W. Grinter

T. W. GRINTER.
PAPER BAG MACHINES.

No. 184,073.

Patented Nov. 7, 1876.

4 Sheets—Sheet 4.

Attest.
N. B. Smith
C. Clarence Poole

Inventor.
T. W. Grinter
By his atty
Rob. O. Smith

UNITED STATES PATENT OFFICE.

THOMAS W. GRINTER, OF CINCINNATI, OHIO, ASSIGNOR OF ONE-HALF HIS RIGHT TO JOSEPH F. JEWETT, OF SAME PLACE.

IMPROVEMENT IN PAPER-BAG MACHINES.

Specification forming part of Letters Patent No. 184,073, dated November 7, 1876; application filed May 5, 1876.

*To all whom it may concern:*

Be it known that I, THOMAS W. GRINTER, of Cincinnati, Ohio, have invented certain Improvements in Paper-Bag-Tubing Machines, of which the following is a specification:

My invention relates to machinery for making tubes from which is formed the well-known satchel-bottom paper bag; and has for its object the provision of suitable devices for cutting a lip to the tube. The use of this lip is twofold. The extended end serves as a place for catching hold of by machinery and opening out the end of the tube when the bottom of the bag is made (suitable mechanisms for which will form the subject-matter of an application for separate Letters Patent.) The depressed part renders the bag easily opened for use.

Obviously my improvements may be applied in ways varying somewhat in their details of construction from those represented in the accompanying drawings.

Figure 6:
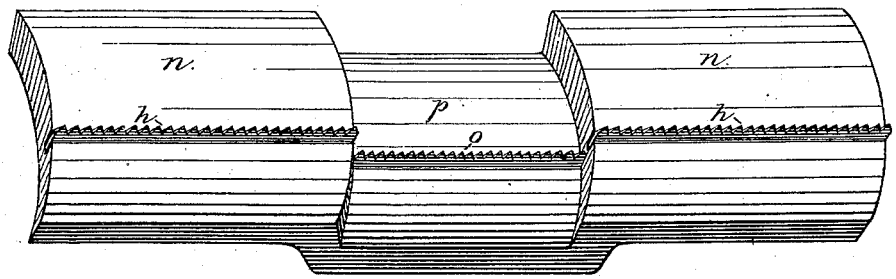
Figure 8:
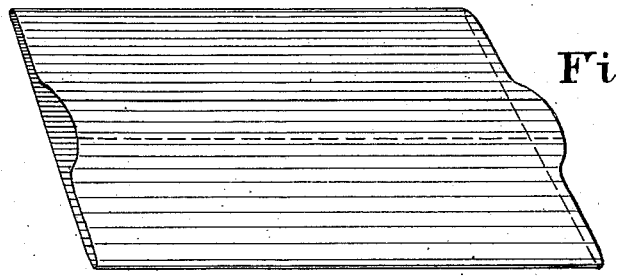
Figure 7:
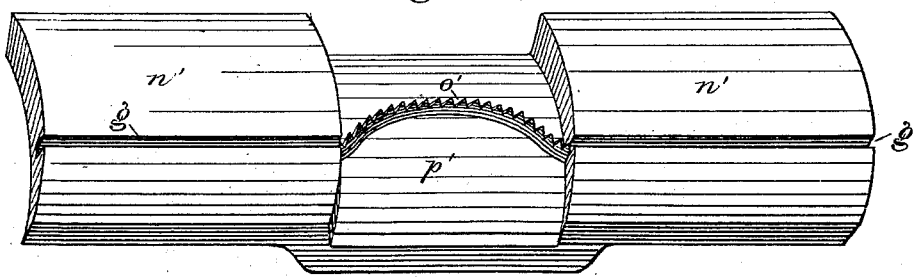
Figure 10:
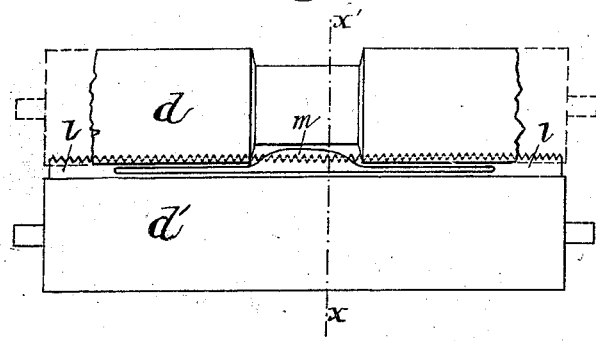
Figure 11:
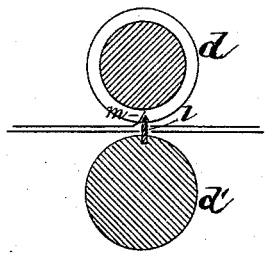
Figure 12:
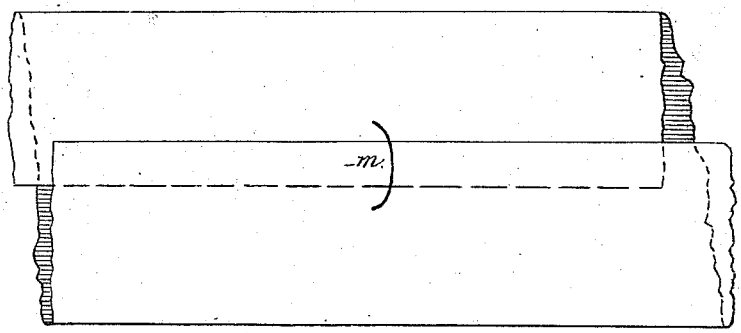
Figure 13:
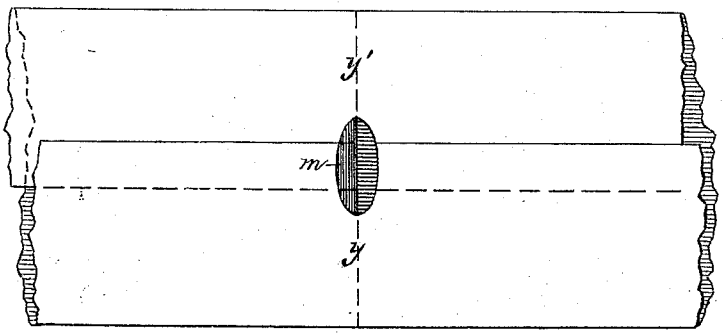
Figure 14:
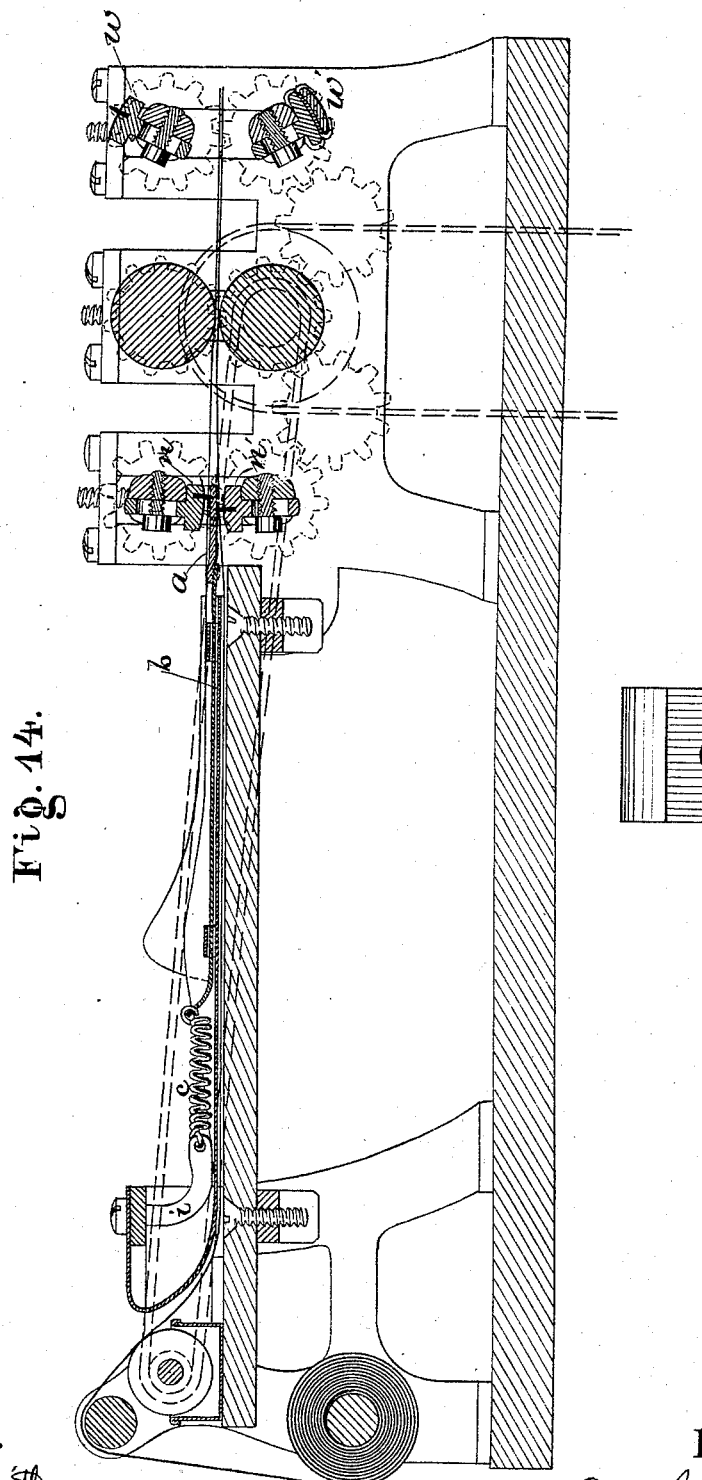
Figure 15:
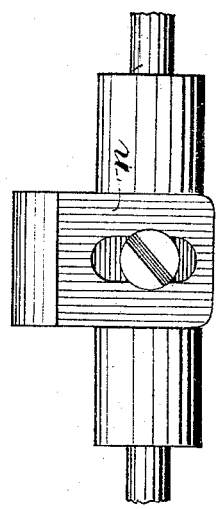

Figure 1 is a side view of a common tube, and shows the position of the cutting-plate and segments. Fig. 2 is a longitudinal section through the cutting-plate and segments, showing the manner of attaching the plate, and the position of the plate and segments when the upper side of the lip is cut. Fig. 3 shows the position of the plate and segments when the lower side of the lip is cut. Figs. 4 and 5 are face views of segments with knives to make a lip-cut on both sides of the tube when the remainder of the tube is cut at another point. Figs. 6 and 7 are face views of segments, with knives for cutting the lip and severing the remainder of the tube at the same place. Fig. 8 is a view of the tube. Fig. 9 is a top view of the cutting-plate and connections. Fig. 10 shows the manner the cutting-rollers sever the tube when a lip cut has been previously made on one side of the tube only. Fig. 11 is a section on the line $x\,x'$ of Fig. 10. Fig. 12 is a top section of the endless tube of paper, showing the lip-cut made on one side of the paper only. Fig. 13 shows the lip as it turns up when the cutting-knife $l$ cuts through the other part of the tube on the line $y\,y'$. Fig. 14 is a longitudinal section of a machine adapted to many sizes of bags. Fig. 15 is a side elevation of one of the segments and cutter.

The operation of forming the paper into a tube, applying the paste, and carrying it forward being identical with that of machines in general use, I deem a particular description of these parts unnecessary, and will only refer to them in so far as is necessary to show the proper connection and operation of my invention. I either cut the lip and sever the remainder of the tube at the same point, or make the lip-cut and sever the tube at a different place, both of which operations I use in a practical machine. In large heavy bags I make the lip-cut and sever the remainder of the tube at separate points. For lighter bags I perform both operations at the same place. If the cuts are made at different places, I make the lip-cut with the segments, Figs. 4 and 5, and sever the tube with the knife $l$ in rollers $d\,d'$. When the cuts are made together the knife $l$ is taken out of the rollers $d\,d'$, the segments alone doing the work.

In Fig. 1 is shown a side view of a common tube. The paper is folded around a former, $i$, and carried forward by the rollers $d\,d'$. Inside the tube I place a plate, $a$, of any suitable material—preferably rubber. If all the cuts are to be made at the same time, this plate with the segments $n\,n'$ are placed beyond the rollers $d\,d'$. If the cuts are to be made at separate points, I prefer placing them in front of the rollers $d\,d'$. Passing back through a groove turned in the center of the rollers $d\,d'$ is a cord or small rod, $b$, connecting the plate $a$ with the stationary bar $i$ by means of the spring $c$. The plate $a$ lies in the center of the tube, and in the path of the revolving segments $n\,n'$, so that at each revolution these segments take hold of the plate and carry it forward a short distance, then release their hold, when, by the action of the spring $c$, it is drawn back again.

The plate $a$ is of such size as to fill the depressed part $p\,p'$ of the segments $n\,n'$, Figs. 6 and 7. In the depressed part of the segments are knives $o\,o'$ for cutting the lip, the shape of the knives determining the shape of the lip. In one side is a straight knife, $o$, cutting in the line of the severing-knife $h$; in the other side a curved knife, $o'$, its ends terminating in the line of the severing-knife $h$. The small knives $o$ $o'$ match in grooves in the plate $a$. The severing-knife $h$ matches in the groove $g$ of the corresponding segment. These segments are used when the cuts are made at one place. When cuts are made at separate places, segments shown in Figs. 4 and 5 are used with knives, as shown, if a lip-cut is made on each side of the paper; but if a lip-cut is made on one side of the paper only, as in Figs. 12 and 13, the straight knife $t$ of Fig. 4 is taken out, and only the curved knife $v$ in Fig. 5 used.

The manner of operation when the cuts are made at the same place is as follows: The paper, passing from the reel A over the paste-wheel C, is drawn under the guide-wheel E and around the former $i$, and carried forward by the rollers $d$ $d'$. As the plate $a$ is inside the tube, and the knives $o$ $o'$ in the depressed parts $p$ $p'$ of the segments $n$ $n'$ match in grooves in the plate $a$, and the severing-knife $h$ in the segment $n$ matches in the groove $g$ of the corresponding segment $n'$, at every revolution of these segments a tube, as shown in Fig. 8, will be cut. When the tube is cut in this way the severing-knife $l$ in the rollers $d$ $d'$ is not used.

If the lip-cut is made at one point and the balance of the tube severed at another, segments, a face view of which is seen in Figs. 4 and 5, are used to cut the lip, and the tube is then cut by the knife $l$ in the rollers $d$ $d'$. In this case I prefer placing the segments and plate $a$ in front of the rollers $d$ $d'$. Preferably I use only the curved knife $v$ in the segment, Fig. 5, thereby cutting a lip, $m$, on one side of the paper only, as shown in Figs. 12 and 13. The roller $d$ is grooved, as shown, so that the lip $m$, which, being free, may turn up into the groove while the knife $l$ cuts the other part of the tube on the line $y$ $y'$.

In the drawings which accompany this specification I have only exhibited the devices in position and shape for cutting the lip after the tube is formed. This must necessarily be the case when the tube is all severed at once; and when the lip is cut first, as shown in Figs. 12 and 13, I prefer that it be done as close as practical to where the other part of the tube is severed, thereby enabling me the more easily to make the last cut match with the lip-cut. But this lip may be cut by rollers, segments, or otherwise, at any point from the reel A to where the last cut is made. When the lip is cut in the paper before it is formed into a tube, it is preferably done on the side opposite to that shown in Figs. 12 and 13, or opposite the seam, if one side only is cut. My object in this way of cutting the lip is to claim devices for cutting the lip $m$, Figs. 12 and 13, in connection with others for severing the remainder of the tube. Figs. 4 and 5 and Figs. 6 and 7 are different faces for the segments $n$ $n'$, Fig. 1. If the lip $m$ is cut in the paper before being formed into a tube, it is done by a knife similar to the curved knife $v$, Fig. 5, matching in the groove of a corresponding roller or segment; and any shape may be given to the knife that is desired for the lip. When the cuts are all made at one place the segments $n$ $n'$ may be complete rollers except the part $p$ $p'$ for taking hold of the plate $a$. In this case they may feed the paper forward, unassisted by other rollers.

As the manner of driving tubing-machines in common use is well known, I have omitted representing some of the connections. The feed-rollers $d$ $d'$ are driven in the ordinary way by belt or gearing. The segments $n$ $n'$ are driven by idlers connected with the feed-rollers $d$ $d'$ or by bevel-gearing, as shown in Fig. 1.

In machines requiring changes for many sizes of bags, I prefer making the lip cut and severing the remainder of the tube both by means of adjustable segments. In this case I place the segments $n$ $n'$ for cutting the lip before the feed-rollers, and in the rear of the feed-rollers I place larger segments $w$ $w'$ for severing the tube, as shown in Fig. 14. On the face of one of the segments $w'$ I preferably have a cutting-bed of rubber, and in the other segment $w$ I place a cutting-knife the same as the knife $l$, Figs. 10 and 11. If the lip-cut is made on both sides of the tube by the knives $v$ and $t$ in segments $n$ $n'$, then, preferably, I cut away a small place in the center of the knife $l$ immediately when the lip-cut falls.

I claim as my invention—

In a paper-bag-tubing machine, the elastic cutting-plate $a$, having transverse grooves, substantially as and for the purpose hereinbefore set forth.

2. The segments $n$ and $n'$, provided with cutters O O', substantially as and for the purpose described.

3. The combination, substantially as set forth, of the segments $n$ $n'$ and the plate $a$, whereby the plate is clamped and carried forward while the lip is being cut and afterward released.

4. The combination, substantially as set forth, of the spring $c$ and rod or cord $b$, the plate $a$, and operative segments $n$ $n'$, so connected as to draw it back after said plate has been carried forward and released.

5. The combination, with segments $n$ $n'$, substantially as set forth, of the knives O O' for cutting the lip, and the knife $h$ for severing the remainder of the tube, whereby the lip is cut and the tube severed at the same point.

In testimony whereof I have hereunto subscribed my name.

THOS. W. GRINTER.

Witnesses:
GEO. E. JEWETT,
F. E. COWING.